Patented Mar. 26, 1940

2,195,011

UNITED STATES PATENT OFFICE 2,195,011

PROCESS FOR THE MANUFACTURE OF WATER-INSOLUBLE DYESTUFFS AND PRODUCTS OBTAINED THEREFROM

Pierre Petitcolas, Rouen, René Goupil, St. Etienne-du-Rouvray, and Joseph Frenkiel and Rudolf Senti, Rouen, France, assignors to Compagnie Nationale de Matieres Colorantes et Manufactures de Produits Chimiques du Nord Reunies, Etablissements Kuhlmann No Drawing. Application July 20, 1938, Serial No. 220,332. In France July 27, 1937

7 Claims. (Cl. 260—157)

The present invention concerns a process for the manufacture of water-insoluble azo dyestuffs which consists in coupling in substance or upon the fibre diazo or tetrazo-derivatives not containing solubilising groups such as COOH or $SO_3H$ groups with acyl-acetylated derivatives of heterocyclic bases of general formula:

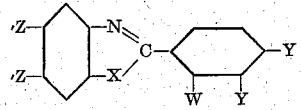

in which either X represents an oxygen atom, and one Z, or one Y, or one Y and one Z, or one Z and W represent an $NH_2$ group or groups; or X represents a sulphur atom and one Z, or one Z and one Y, or one Z and W represent an $NH_2$ group or groups. In both cases the phenyl nuclei may be substituted by groups such as alkyl, alkoxy or aryloxy groups, halogen atoms, or other substituents incapable of rendering the products water-soluble.

Certain of the heterocyclic bases in question are already known while others are prepared for the first time and there was used for this purpose, for example one of the following methods.

In a general manner by reduction and cyclisation by means of stannous chloride of an O-benzoyl-orthonitro-phenol or of an O-benzoyl-orthonitro-thiophenol containing if desired other substituents, a 2-phenyl-benzoxazole in the first case or a 2-phenyl-benzothiazole in the second case is obtained. The introduction of the amino group or groups into these derivatives may take place before or after the cyclisation; one may for example start from an O-benzoyl-orthonitro-phenol containing one or two supplementary nitro groups which will be reduced during the cyclisation or one may nitrate and then reduce a 2-phenyl-benzothiazole or one may start from an ortho-nitro-phenol containing an acylamino group which will be saponified after cyclisation.

Certain of the methods capable of being utilised for obtaining heterocyclic bases are formulated below.

First method

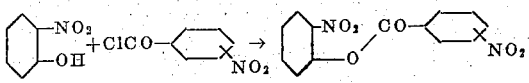

which reduced and rendered cyclic by stannous chloride, gives:

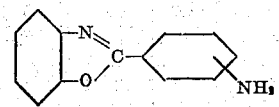

Second method

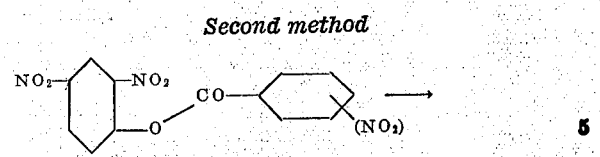

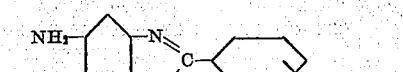

Third method

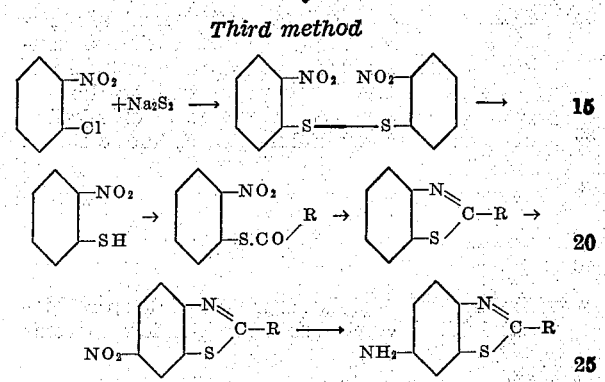

Fourth method

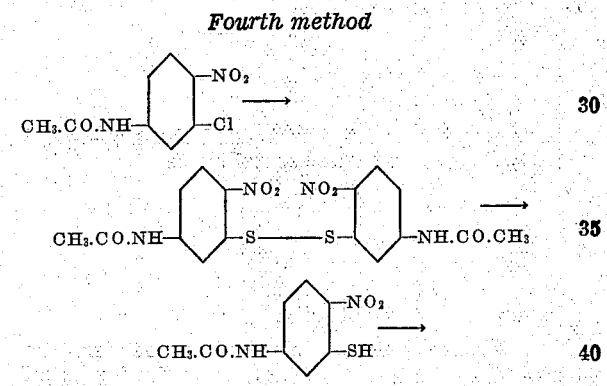

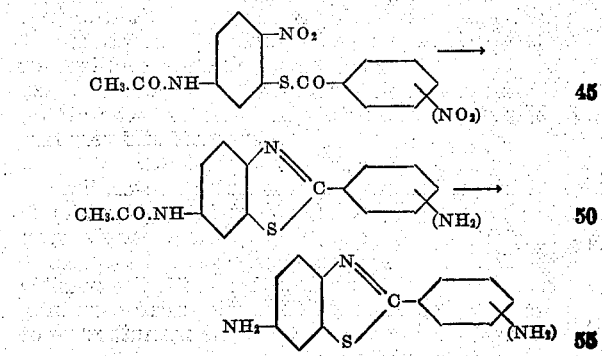

Fifth method

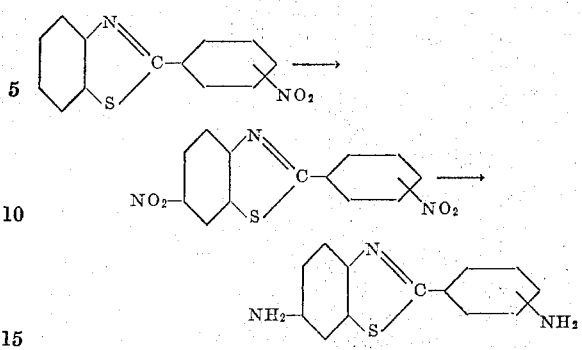

As has been indicated above the heterocyclic bases in question are according to the invention condensed with the acyl-acetic esters; as acyl-acetic esters there may be employed such derivatives of the mono- or polybasic acids as the acetyl-acetic esters, benzoyl-acetic esters, terephthaloyl acetic esters etc.

The condensation between the acyl-acetic esters and the heterocyclic base may take place in the presence of a solvent for example chlorobenzene or in the absence of such a solvent, or in the presence of an excess of ester thus acting as solvent, but preferably at elevated temperature.

The acyl-acetyl derivatives obtained are utilised according to the present invention as coupling components in the preparation of insoluble azodyestuffs. They have in general, as the applicants have observed, in the form of alkaline salts, a very marked affinity for cellulosic fibres, while the acyl-acetyl compounds of dehydrothioparatoluidine which has a constitution approximately as follows:

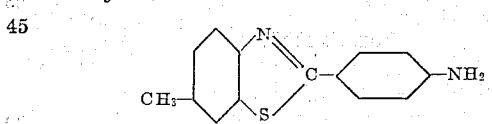

have practically no affinity and the acyl-acetyl derivatives of 2-aminobenzothiazole

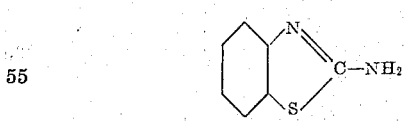

have a rather low affinity.

This affinity for cellulosic fibres renders the acylacetyl derivatives according to the invention particularly valuable for the preparation on the fibre of insoluble azodyestuffs. By treatment of cellulosic fibres padded in alkaline solutions of these compounds by means of solutions of diazo compounds derived from bases not containing water-solubilising groups, very vivid and very fast yellow shades may in fact be obtained.

The present invention is not, however, limited to this special process of obtaining dyestuffs, it extends to the preparation of the dyestuffs upon the fibre by any known process for the preparation of dyestuffs upon the fibre with the possible use of diazo-amino derivatives, nitroso-amines, Schiffs bases etc. as well as the manufacture of dyestuffs in substance.

The following examples of the carrying out of the invention are given in a non-limiting way.

Example 1

1 part of 5-amino-2-phenyl-benzoxazole are heated in 4 parts of acetyl-acetic ether in the presence of a little sodium ethylate for a few minutes at boiling while distilling the alcohol. On cooling the acetoacetyl derivative crystallises. It is filtered and washed with a little alcohol to eliminate the excess of acetyl acetic ether. When crystallised from alcohol the product forms fine colourless crystals of melting point 168° C. It corresponds to the formula

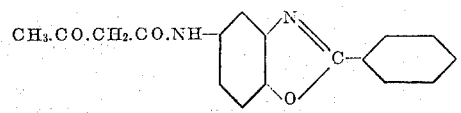

In the same conditions by utilising the 2-p-aminophenyl-benzoxazole, 2-p-acetoacetylamino-phenyl-benzoxazole is obtained of melting point 195–200° C. with decomposition corresponding to the formula

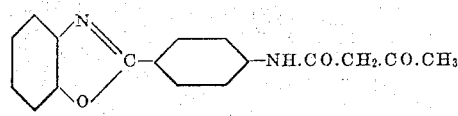

With the 5-amino-2-p-aminophenyl-benzoxazole (M. P. 230° C.) there is obtained with acetyl-acetic ether as is indicated above, the 5-acetoacetylamino-2-p-acetoacetylamino-phenyl-benzoxazole in colourless needles (melting point 240° C.) which corresponds to the formula

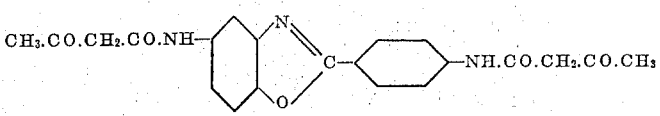

3 grams of 5-acetoacetylamino-2-(p-acetoacetylamino)-phenyl-benzoxazole are pasted with 6 ccs. of ethyl alcohol, 2 ccs. of soda solution of 34° Bé. and 3 ccs. of water. It is diluted in 1 litre of water containing 15 grams of salt, 5 ccs. of sodium sulphoricinate and 8 ccs. of soda of 34° Bé.

Into this padding bath are introduced for half an hour 50 grams of bleached cotton threads. The thread is expressed strongly and developed in a diazo bath containing per litre 3 grams of o-nitraniline in the state of diazonium chlorozincate, 8 grams of $Al_2(SO_4)_3$ and 2 grams of glacial acetic acid. It is rinsed thoroughly and soaped at the boil for half an hour in a bath containing per litre 2 grams of Marseilles soap and 2 grams of sodium carbonate. A yellow gold colour is obtained having very good fastness properties.

By replacing the diazotised o-nitraniline by diazotised dichloro-aniline-1.2.5 a vivid yellow is obtained. With diazotised o-chloraniline a vivid greenish yellow is obtained. If the padding bath is prepared with 2-p-acetoacetylamino-phenyl-benzoxazole and if development is performed with diazotised ortho-nitraniline a vivid yellow is obtained.

Example 2

160 grams of 2-nitro-4-methyl-1-thiophenol (prepared according to known methods starting from 4-methyl-2-nitro-1-chlorobenzene, by transformation to disulphide followed by partial reduction by glucose) are dissolved in 1600 ccs. of water and 126 ccs. of caustic soda of 35° Bé. With brisk agitation 180 grams of benzoyl chloride are poured in. The benzoylated derivative precipitates almost instantaneously. There are then added drop by drop 120 ccs. of soda solution of 35° Bé. and the mixture is heated for half an hour at 50-60° C. The crystals are filtered and washed with water. The yield is about 70-75%.

The crude product melts at 98-100° C. When recrystallised from alcohol it has the form of small yellow crystals (M. P. 106° C.).

A reducing mixture is prepared with 300 grams of iron filings, 800 ccs. of water and 30 ccs. of acetic acid brought to boiling in 15 minutes. Into this is introduced 150 grams of the benzoyl derivative mentioned above and heating is continued with agitation for 10 hours. After rendering alkaline the iron residues are filtered which are extracted with a solvent like chlorobenzene. The solvent is removed with steam. The crystallised residue is constituted by 5-methyl-2-phenyl-benzothiazole in an almost pure state (M. P. 145° C.). After recrystallisation from alcohol its melting point is 148° C. The reduction may likewise be carried out with zinc and dilute acetic acid or even with zinc and water in the presence of chlorobenzene by starting the reduction with a little acetic acid.

80 grams of 5-methyl-2-phenylbenzothiazole are pasted with 300 ccs. of sulphuric acid monohydrate and then 70 grams of mixed acid are poured in with 35% $HNO_3$, 1% water and 64% $H_2SO_4$. The mixture is heated for 4 hours at 60° C. and then allowed to cool to ordinary temperature. The mass is poured upon ice. The crystals of nitrate derivatives are filtered and washed in water and then, after drying, purified by crystallisation in chlorobenzene (yellow crystals of melting point 240° C.). The 6-nitro-5-methyl-2-phenylbenzothiazole is reduced by Bechamps' method.

100 grams of iron powder are heated in 1000 ccs. of water and 30 ccs. of acetic acid. The nitrated derivative is introduced into this reducing mixture and the mixture is heated to boiling for ten hours. After rendering the reduction mass alkaline there is extracted with chlorobenzene. The solvent is removed with water vapour to isolate the base (M. P. approximately 220° C.). The yield is 60% starting from 5-methyl-2-phenylbenzothiazole. When recrystallised from alcohol in which it dissolves with blue fluorescence the 5-methyl-6-amino-2-phenylbenzothiazole exhibits the form of needles which are almost colourless (M. P. 228° C.).

15 grams of this base are heated for ten minutes while distilling the alcohol formed in the reaction with 40 ccs. of boiling acetylacetic ether (in the presence of a little sodium ethylate). The product is allowed to crystallise by cooling and diluted with its own volume of ethyl alcohol or ether then the crystals of the acetoacetyl derivative are filtered and washed with a little alcohol to eliminate the excess of acetylacetic ether (yield 75%). The 6-acetoacetyl-amino-5-methyl-2-phenyl-benzothiazole when recrystallised from alcohol exhibits the form of fine yellowish white crystals (M. P.=184° C.).

By condensation with ethyl terephthaloyl acetate in the same way the terephthaloyl-acetyl-bis-(6-amino-5-methyl-2-phenyl-benzothiazole) is obtained.

The 6-acetoacetylamino-5-methyl-2-phenyl-benzothiazole is dissolved with the aid of ethyl alcohol and caustic soda in a padding bath; and threads of cotton treated with this bath and then with a solution of the diazo derivative of 2.5-dichloroaniline are dyed yellow golden shades of good fastness.

Example 3

A solution of sodium disulphide in alcohol is made starting from 310 grams of $Na_2S.9H_2O$, 41 grams of S and 1300 ccs. of ethyl alcohol. Little by little to this solution are added 400 grams of 2.5-dichloro-1-acetylamino-4-nitrobenzene and then the product is heated on the water bath for one hour 30 minutes. It is allowed to cool and then the disulphide crystals are filtered and taken up in 150 ccs. of warm water to eliminate the mineral salts (yield=60%). The product obtained has a melting point above 280° C.

220 grams of this disulphide are pasted in 500 ccs. of alcohol. 160 grams of glucose are added and heated on a water bath for several hours. After cooling, 275 ccs. of soda solution of 35° Bé. is poured in little by little. There is rapidly obtained complete solution, the said solution being dark red. The product is heated for 15 minutes on the water bath and then diluted with 2000 ccs. of warm water. It is filtered to eliminate certain impurities and poured in a thin stream into a solution of iced hydrochloric acid prepared with 500 ccs. of HCl of 20° Bé. and 1000 grams of ice. The thiophenol precipitates in the form of a brownish sludge which is filtered, washed in water and then dried in vacuo. The yield amounts to 80-90% of a product melting at 135° C. When recrystallised from chlorobenzene the 1-chloro-2-acetylamino-5-nitro-4-thiophenol exhibits the form of clear yellow crystals (M. P.=140° C.).

170 grams of this compound are dissolved in 1000 ccs. of water with the aid of 90 ccs. of soda solution of 35° Bé. Into this solution are poured 125 grams of benzoyl chloride while cooling externally so that the temperature does not exceed 20° C. It is then mixed for 3 hours, then the temperature is raised to 70-80° C. after it has been rendered alkaline with sodium carbonate. The crystals of the benzoyl derivative are filtered, washed in hot water and dried. After recrystallisation from chlorobenzene the product exhibits the form of clear yellow crystals (M. P.=167° C., yield about 80%).

100 grams of 1-chloro-2-acetylamino-5-nitro-4-benzoyl-thiophenol are finely powdered and introduced into a reducing mixture cooled to 10° C. and prepared with 1000 ccs. of concentrated HCl and 400 grams of stannous chloride. It is allowed to mix for ten hours in the cold. Then it is heated for one hour with gentle boiling. The crystals are filtered and washed in water. They are taken up with 1000 ccs. of water, 200 ccs. of soda solution of 35° Bé. and 50 grams of tartaric acid. The product is heated to boiling for 15 minutes and then the creamy white crystalline melt is filtered and washed thoroughly. When recrystallised from alcohol the 5-chloro-6-amino-2-phenyl-benzothiazole exhibits the form of fine straw-yellow needles (M. P. 180° C.). In alcoholic solution it shows a slight violet fluorescence.

Analysis

|   | Calculated | Found |
|---|---|---|
| N% | 10.74 | 10.82 |
| Cl% | 13.62 | 14.06 |
| S% | 12.38 | 12.39 |

Acetoacetylation is effected as in the preceding example. When recrystallised from alcohol or chloro-benzene the 6-acetoacetylamino-5-chloro-2-phenyl-benzothiazole exhibits the form of a white powder (M. P.= 176° C.).

3 grams of 6-acetoacetylamino-5-chloro-2-phenylbenzothiazole are pasted with 6 ccs. of denatured alcohol, 2 ccs. of caustic soda of 34° Bé. and 6 ccs. of cold water. If desired it is heated in order to dissolve it and the solution is poured into a litre of cold water to which have previously been added 30 grams of common salt, 5 ccs. of sulphoricinate and 8 ccs. of caustic soda of 34° Bé. Into this padding bath are inserted for 30 minutes, 50 grams of bleached cotton thread. The thread is well dried and developed in a diazo bath containing per litre 3 grams of dichloroaniline 1.2.5. in the state of diazonium chlorozincate, 10 grams of $Al_2(SO_4)_3$ and 2 ccs. of acetic acid. It is well washed and soaped at the boil for half an hour in a bath containing per litre 2 grams of soap and 2 grams of sodium carbonate. A yellow shade is obtained having very good fastness properties.

By replacing the dichloroaniline by o-nitraniline or p-chloro-o-nitraniline very full yellows are obtained likewise having good fastness properties.

Example 4

A solution of sodium disulphide is prepared starting from 490 grams of $Na_2S.9H_2O$, 2000 ccs. of ethyl alcohol and 66 grams of sulphur. The solution is added little by little to 680 grams of 1-acetylamino-2-methoxy-4-nitro-5-chlorobenzene in suspension in the cold in 1000 ccs. of alcohol. The temperature rises itself and the disulphide commences to crystallise in fine clear yellow needles. The product is heated to boiling on the water bath for 1½ hours then allowed to cool completely, filtered, and then washed thoroughly in water. The 3.3'-diacetylamino-4.4'-dimethoxy-6.6'-dinitro-1.1'-diphenyldisulphide formed is sparingly soluble in alcohol, a little more in chlorobenzene from which it crystallises in clear yellow needles (melting point above 230° C., yield about 80%).

330 grams of this disulphide are heated with 800 ccs. of alcohol and 260 grams of glucose at 60° C. 450 ccs. of soda solution of 35° Bé. is introduced in small portion with strong agitation. Complete solution is rapidly obtained, the solution being dark red. Heating is continued for a quarter of an hour on the water bath and the product poured into 1500 ccs. of warm water, a light residue is filtered and the product is poured in a thin stream with good agitation into 500 ccs. of HCl to which 1500 grams of ice have been added. The crystals of thiophenol are filtered and washed in water. The crude product melts at 135° C. After purification from chlorobenzene it exhibits the form of golden yellow crystals (M. P. 140° C.=yield about 85%).

200 grams of the above thiophenol are dissolved in 2000 ccs. of water and 90 ccs. of the soda solution of 35° Bé. The product is filtered to eliminate a slight residue and after the addition of 26 grams of sodium carbonate it is cooled externally and into it is poured little by little with brisk agitation 185 grams of benzoyl chloride. The temperature should not exceed 15° C. to prevent formation of disulphide. After three hours of mixing at ordinary temperature it is heated gradually to 70° C. which temperature is maintained for an hour while testing for alkalinity with β-yellow. The benzoylated derivative formed remains crystalline. It is filtered in the hot and washed with water. When recrystallised from chlorobenzene the 1-acetylamino-2-methoxy-4-nitro-5-benzoyl-thiophenol gives almost colourless crystals (M. P.=183° C., yield about 85%).

300 grams of benzoylated derivative are finally comminuted and pasted in 300 ccs. of concentrated HCl. It is strongly agitated and into it are introduced little by little 1520 grams of stannous chloride while cooling externally with ice. It is allowed to mix for a day in the cold and then brought for 3 hours to 80° C. After cooling, it is filtered and washed in water. The crystals are taken up in 1000 ccs. of water, 200 ccs. of soda solution of 35° Bé. and 50 grams of tartaric acid. The acetylated derivative (M. P.=190° C.) is filtered and washed, which derivative corresponds to the formula:

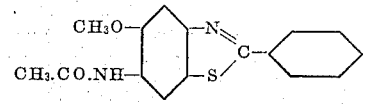

It is saponified in 70% sulphuric acid. The product is heated until it has dissolved, poured upon ice and neutralised with soda. The base precipitates in the form of fine greenish yellow needles. When recrystallised from alcohol it melts at 151° C. Its acetoacetyl derivative is prepared as in the preceding example—M. P. 156° C. (from alcohol).

3 grams of 6-acetoacetyl-amino-5-methoxy-2-phenyl-benzothiazole are pasted in 6 ccs. of denatured alcohol, 2 ccs. of soda of 34° Bé. and 6 ccs. of water. The product is heated to dissolve it and the solution is poured into 1000 ccs. of water to which 5 ccs. of sodium sulphoricinate and 8 ccs. of soda of 34° Bé. have been previously added. Into this padding bath are inserted for half an hour 50 grams of well boiled cotton thread. The thread is strongly pressed and developed in a diazo bath containing per litre 3 grams of dichloroaniline 1.2.5. in the state of diazonium chlorozincate, 10 grams of $Al_2(SO_4)_3$ and 2 ccs. of glacial acetic acid. After washing and soaping as in the previous example, a golden yellow tint is obtained having very good fastness properties. By replacing the diazo derivative of dichloroaniline by that of o-chloroaniline, a greenish yellow shade is obtained.

Example 5

50 grams of 2-p'-nitrophenylbenzothiazole are dissolved in 500 grams of sulphuric acid of 66° Bé. The product is agitated while adding 120 grams of mixed acid with 33% of $HNO_3$, 66% of $H_2SO_4$, and 1% of $H_2O$. The temperature rises to 65–70° C. It is maintained at this for an hour and the mass is then poured upon ice. The nitrated derivative is filtered and washed (dry weight=60 grams, M. P.=220–230° C.). By crystallisation from boiling acetic acid, fine needles which are very little coloured are isolated (M. P.=240° C.) whose analysis corresponds to the dinitro derivative of formula

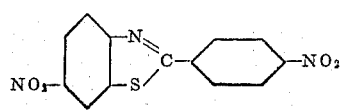

Analysis:

|   | Found | Calculated for $C_{13}H_7O_4N_3S$ |
|---|---|---|
|   | Percent | Percent |
| C% | 51.35 | 51.48 |
| H% | 2.35 | 2.3 |
| N% | 13.45 | 13.86 |
| S% | 10.53 | 10.56 |

It may be reduced in the following manner:

65 grams of 6-nitro-2-p′-nitrophenylbenzothiazole are pasted in 800 ccs. of concentrated HCl and then 300 grams of stannous chloride are added. The product is heated to boiling for half an hour and then allowed to cool. By addition of alcohol the diamine hydrochlorate is precipitated and is filtered and washed with a little alcohol containing hydrogen chloride. The crystals are taken up in an excess of dilute caustic soda to which tartaric acid is added. The base is filtered thoroughly, washed with water and dried (weight 45 grams—M. P. 255° C.). By recrystallisation from chlorobenzene fine slightly yellow flakes are obtained—M. P. 260° C. (n. c.).

Analysis:

|   | Found | Calculated for $C_{13}H_{11}N_3S$ |
|---|---|---|
| C% | 64.39 | 64.73 |
| H% | 4.61 | 4.56 |
| N% | 16.79 | 17.42 |
| S% | 13.54 | 13.24 |

30 grams of 6-amino-2-p′-aminophenylbenzothiazole are dissolved in 100 ccs. of acetyl acetic ether to which has been added 1 cc. of normal solution of sodium ethylate. The product is heated to boiling while distilling the alcohol formed in the reaction. After a few minutes all diazotisable base has disappeared. The product is allowed to cool and the crystals are filtered and washed with ethyl alcohol to eliminate the acetylacetic ether used. The acetoacetylated derivative exhibits the form of large yellowish crystals readily soluble in dilute soda. The yield amounts to 80–85%.

1.5 grams of the above acetoacetylated derivative are pasted with 3 ccs. of ethyl alcohol to which 1.5 ccs. of soda solution of 35° Bé. have been added. The product is diluted with 5 ccs. of hot water to obtain complete solution. This solution is poured into 1000 ccs. of water to which have been added 5 ccs. of sodium sulphoricinate, 5 ccs. of soda solution of 35° Bé. and 15 grams of common salt.

In this padding bath is immersed for half an hour 50 grams of well boiled cotton thread. The thread is strongly pressed and developed in a diazo bath containing per litre 3 grams of dichloroaniline 1.2.5. (1=NH₂) in the state of diazonium chlorozincate, 8 grams of aluminium sulphate and 5 ccs. of glacial acetic acid. After half an hour it is thoroughly rinsed and soaped for twenty minutes at the boil in a bath containing per litre 2 grams of Marseille soap, 0.5 gram of sodium hydrosulphite and 0.5 cc. of soda of 35° Bé. There is thus obtained a very vivid yellow having very good fastness properties. By replacing the dichloraniline by o-chloroaniline, a vivid greenish yellow shade is obtained likewise having good fastness properties.

*Example 6*

125 grams of 1.4-dichloro-2-acetylamino-5-nitrobenzene are dissolved in 300 ccs. of hot alcohol. This solution is poured into a solution of KHS prepared by saturating with H₂S a solution of 56 grams of KOH dissolved in 2000 ccs. of ethyl alcohol and 60 ccs. of water. The solution becomes deep red. It is heated on the water bath for some minutes; a sample diluted with water should leave behind no precipitate. The alcoholic solution is poured into 9000 grams of ice, 1000 ccs. of H₂O and 200 ccs. of concentrated HCl. The thiophenol precipitates. It melts at 140° C. (chlorobenzene).

The thiophenol is filtered and utilised while still damp; it is dissolved in the cold in 1000 ccs. of water and 70 ccs. of soda solution of 35° Bé. Small quantities of impurities are filtered and with good agitation 95 grams of p-nitrobenzoylchloride dissolved in 150 ccs. of chlorobenzene are poured in, in the cold. After two hours of vigorous mixing the solution is completely decolourised. It is neutralised with a little acetic acid, and then the solvent is removed with water vapour. The condensation product which separates in the form of crystalline flakes is filtered, washed and dried.

50 grams of the above derivative are pasted in 500 ccs. of concentrated hydrochloric acid. 350 grams of stannous chloride are added while mixing. The temperature rises by itself to 60° C. At first complete dissolution is observed. At the end of a few minutes there is precipitation of crystals. The product is filtered and washed with a little HCl. The crystals are taken up in hot dilute soda. The diamine is filtered, washed and dried. (Yield 80–85%, M. P.=238° C.). It corresponds to the formula

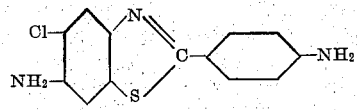

By condensation with ethylbenzoylacetate the corresponding dibenzoylacetylated derivative is obtained which is utilised as substantive component in dyeing by ice colours.

*Example 7*

20 grams of 5-amino-2-p′-aminophenyl-benzothiazole are dissolved at the boil in 100 ccs. of acetyl acetic ether to which 1 cc. of normal solution of sodium ethylate are added. The product is heated for some minutes while distilling the alcohol formed in the reaction until no diazotisable base remains. By cooling, the diazoacetylated derivative crystallises in the form of large crystals which are filtered and washed in alcohol to eliminate the excess of acetylacetic ether. (Yield about 80%).

3 grams of this acetoacetylated derivative are pasted in 3 ccs. of soda solution of 35° Bé. and 6 ccs. of ethyl alcohol. The product is slightly heated and diluted with warm water until a clear solution is obtained. The volume is brought to a litre and 5 ccs. of sodium sulphoricinate are added, 15 grams of common salt and 5 ccs. of soda solution of 35° Bé. 50 grams of well boiled cotton thread are placed for half an hour in this padding bath. After drying the product is developed in a diazo bath prepared as in Example 5 with the diazonium chlorozincate of dichloroaniline 1.2.5. By continuing the treatment as in Example 5 a yellow greenish shade is obtained of good fastness properties.

Example 8

400 grams of 2-nitro-4-methoxy-5-acetylaminothiophenol are dissolved in 1600 ccs. of water to which have been added 170 ccs. of soda solution of 35° Bé. in the cold. A slight insoluble residue is filtered and then the product is cooled from outside with iced water. After having added 80 grams of sodium carbonate dissolved in 200 ccs. of water the product is violently agitated while pouring into it little by little a solution of 315 grams of p-nitrobenzoyl-chloride dissolved in 500 ccs. of chlorobenzene. After two hours of mixing the product is heated to 90° C. for half an hour. The product is allowed to cool and then the large crystals impregnated with chlorobenzene are separated. They are taken up in 500 ccs. of chlorobenzene at 30–40° C., filtered and then washed with 500 ccs. of cold ethyl alcohol. They are filtered and dried. The nitrobenzoylated derivative which corresponds to the formula

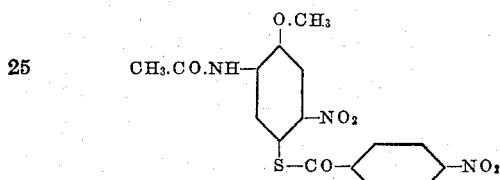

is recrystallised from chlorobenzene; it exhibits then the form of yellow prisms (M. P.=208° C.).

133 grams of this derivative are pasted with 600 ccs. of concentrated HCl. 1200 grams of $SnCl_2$ are added. After three hours of cold mixing the product is brought to the boil for two hours. After complete dissolution it is still left at that temperature for half an hour. After cooling, the product is diluted with 1000 ccs. of water and 500 grams of ice, then rendered alkaline with caustic soda until the tin oxide is redissolved. The base is filtered and washed with water. It exhibits the form of fine yellowish crystals which, when recrystallised from chlorobenzene form slightly brownish needles (M. P. 237° C.) corresponding to the formula

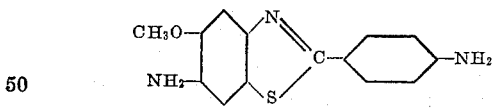

The yield amounts to 65–70%.

20 grams of this diamine are introduced into 120 ccs. of acetylacetic ether to which 1 cc. of normal sodium ethylate solution have been added. The product is gradually heated to the boil while distilling the alcohol formed in the reaction. After a few minutes, diazotisable base is no longer found. By cooling, the diacetoacetylated derivative precipitates in fine crystals which are filtered and washed in alcohol. Purified with chlorobenzene the product melts at 210° C. The yield amounts to 90%.

1.5 grams of this diacetoacetylated derivative are pasted with 100 ccs. of soda solution of 35° Bé. and 5 ccs. of ethyl alcohol. The product is diluted with hot water until it is completely dissolved and then it is brought to a volume of 1000 ccs. with cold water to which 5 ccs. of sulphoricinate and 15 grams of common salt have been added.

50 grams of well boiled cotton thread are immersed for half an hour in this padding bath. The thread is dried and the dyeing developed in a diazo bath prepared as in Examples 3 and 4 with dichloroaniline. The treatment is continued in the same conditions and a very fast golden yellow is obtained. By replacing the dichloroaniline by o-chloroaniline, a vivid yellow is obtained likewise of good fastness.

Example 9

50 grams of 6-amino-2-phenylbenzothiazole M. P.=198° C. (see Bogerth, Hugh, Blacke, Carbitt, CB 1926, II, 30 and CB 1927, II 700)

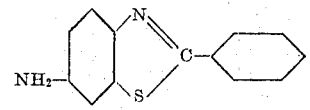

are heated to boiling for some minutes in 80 ccs. of acetyl acetic ether while distilling the alcohol formed. After prolonged cooling the acetoacetylated derivative formed is filtered. It exhibits the form of fine yellowish white needles which are washed in ether.

The dry weight is 30 grams and the melting point 157° C.

By replacing the acetylacetic ether by benzoylacetic ether the 6-benzoyl-acetylamino-2-phenylbenzothiazole is prepared:

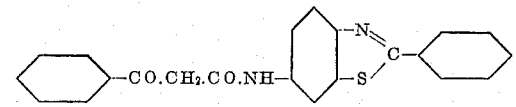

(M. P. 215° C. with decomposition).

70 grams of 6-amino-2-phenylbenzothiazole and 40 grams of the ethyl ether of terephthaloyl acetic acid are dissolved in 500 ccs. of boiling chlorobenzene. A part of the boiled chlorobenzene is gradually distilled to remove the alcohol formed in the reaction. At first there is complete solution, but gradually the condensation product precipitates. After two hours the greenish yellow crystals (M. P. above 300° C.) are filtered which crystals probably correspond to the formula

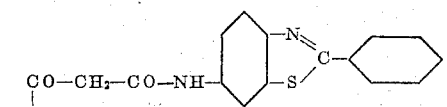

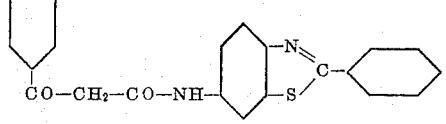

In the cooled filtrate of chlorobenzene one may isolate a yellow compound of melting point 201° C., which probably corresponds to the monocondensed compound.

6 grams of 6-acetoacetylamino-2-phenylbenzothiazole are pasted in 5 ccs. of sodium sulphoricinate and 18 ccs. of soda solution of 35° Bé. Upon this paste is poured 50 ccs. of hot water. The product is diluted with cold water to bring the volume to 1 litre.

30 grams of bleached cotton thread are immersed in this bath for a quarter of an hour. The thread is strongly pressed and the dyeing developed in a diazo bath containing per litre in the state of diazonium chlorozincate, 4 grams of 1-amino-2.5-dichlorobenzene, 15 grams of aluminium sulphate and 3 ccs. of acetic acid. After rinsing in pure water and soaping at the boil for half an hour in a bath containing 2 grams of soap and 2 grams of sodium carbonate per litre, a full greenish yellow shade is obtained of good fastness to chlorine, to boiling in the open air and under pressure and to light.

Example 10

By utilizing the process described in Example 9 there is obtained starting from 5-methoxy-6-amino-2-phenyl-benzoxazole (M. P. 189° C.), 6-acetoacetyl-amino-5-methoxy-2-phenylbenzoxazole (yellowish crystals M. P.=165° C.):

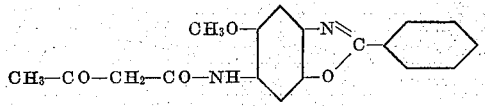

With 5-methyl-6-amino-2-phenylbenzoxazole (M. P.=211° C.) the 5-methyl-6-acetoacetyl-amino-2-phenylbenzoxazole is prepared of melting point 214° C. in the form of almost colourless flakes.

3 grams of 5-methoxy-6-acetoacetylamino-2-phenylbenzoxazole are pasted in 3 ccs. of ethyl alcohol and 2 ccs. of soda solution of 34° Bé. The product is diluted with 2 ccs. of water and the solution is poured into 500 ccs. of water to which 5 ccs. of sodium sulphoricinate and 10 grams of common salt have been added. In this padding bath are immersed for half an hour 20 grams of bleached cotton. After drying it is developed in a diazo bath containing per litre 3 grams of 1-amino-2.5-dichlorobenzene in the state of diazonium chlorozincate, 10 grams of aluminium sulphate and 2 ccs. of acetic acid. After half an hour it is rinsed and then soaped for half an hour at the boil in a bath containing 2 grams of $Na_2CO_3$ and 2 grams of soap per litre. After rinsing and drying a full yellow orange shade is obtained of good fastness properties.

Example 11

152 grams of m-nitro-p-toluidine are diazotised in the usual manner, the diazo solution obtained is added to a solution containing 308 grams of 5-methyl-3-acetoacetyl-amino-2-phenylbenzoxazole. Coupling takes place normally. A yellow dye insoluble in water is obtained utilisable for the colouration of paper, plastic materials, etc.

The following table indicates the shades obtained by using certain coupling components according to this invention in combination with certain diazo derivatives.

| Diazo component | Coupling component | Shade on cotton |
|---|---|---|
| 4-chloro-2-aminotoluene | 6-acetoacetylamino-5-methoxy-2-p-acetoacetyl-aminophenyl-benzothiazole. | Reddish yellow. |
| 4-chloro-2-amino-anisole | do | Vivid yellow. |
| 2-methoxy-4-benzoylamino-5-methylaminobenzene | do | Brownish orange. |
| 3-nitro-4-aminoanisole | do | Orange. |
| 4'-methoxy-4-amino-diphenylamine | do | Brown. |
| Diaminodiphenylamine-azo-3-amino-4-methoxy-toluene | do | Bordeaux. |
| o-Chloraniline | do | Yellow. |
| m-Chloraniline | do | Do. |
| o-Nitraniline | do | Reddish orange. |
| m-Nitraniline | do | Golden yellow. |
| 2-chloro-4-amino-toluene | do | Vivid yellow. |
| 2.5-dichloraniline | do | Golden yellow. |
| 4-nitro-2-amino-toluene | do | Do. |
| 4-nitro-2-amino-anisole | do | Do. |
| 4-chloro-2-nitraniline | do | Reddish orange. |
| p-Nitraniline | do | Orange. |
| 3-nitro-4-amino-toluene | do | Vivid orange. |
| 2-nitro-4-amino-1.3-xylene | do | Yellow. |
| 5-chloro-2-amino-toluene | do | Do. |
| 2-nitro-4-amino-5-methoxy-toluene | do | Reddish yellow. |
| 5-nitro-2-amino-toluene | do | Orange. |
| Alpha-amino-anthraquinone | do | Reddish orange. |
| 5-nitro-2-amino-anisole | do | Orange. |
| 4-chloro-2-amino-toluene | 6-chloro-5-aceto-acetyl-amino-2-p-acetoacetylaminophenylbenzoxazole. | Yellow. |
| 4-chloro-2-amino-anisole | do | Do. |
| 2-methoxy-4-benzoylamino-5-methylamino-benzene | do | Orange. |
| 3-nitro-4-aminoanisole | do | Vivid orange. |
| 4'-methoxy-4-aminodiphenylamine | do | Brown. |
| Diamino-diphenylamine-azo-3-amino-4-methoxy-toluene. | do | Violet Bordeaux. |
| p-Chloro-o-nitraniline | do | Brownish yellow. |
| p-Nitraniline | do | Yellow. |
| 3-nitro-4-amino-toluene | do | Orange yellow. |
| 2-nitro-4-amino-1.3-xylene | do | Yellow. |
| 5-chloro-2-amino-toluene | do | Do. |
| 2-nitro-4-amino-5-methoxy-toluene | do | Reddish yellow. |
| 5-nitro-2-aminotoluene | do | Yellow. |
| Alpha-aminoanthraquinone | do | Orange. |
| 5-nitro-2-aminoanisole | do | Reddish yellow. |
| o-Chloraniline | do | Yellow. |
| m-Chloraniline | do | Do. |
| o-Nitraniline | do | Golden yellow. |
| m-Nitraniline | do | Yellow. |
| 2-chloro-4-amino-toluene | do | Do. |
| 2.5-dichloraniline | do | Do. |
| 4-nitro-2-aminotoluene | do | Do. |
| 4-nitro-2-aminoanisole | do | Do. |
| 4-chloro-2-amino-toluene | 6-acetoacetylamino-5-chloro-2-p-acetoacetylaminophenyl-benzothiazole. | Golden yellow. |
| 4-chloro-2-amino-anisole | do | Yellow. |
| 2-methoxy-4-benzoylamino-5-methylaminobenzene | do | Orange brown. |
| 3-nitro-4-aminoanisole | do | Orange. |
| 4'-methoxy-4-amino-diphenylamine | do | Reddish brown. |
| Diamino-diphenylamine-azo-3-amino-4-methoxy-toluene. | do | Violet Bordeaux. |
| p-Chloro-o-nitraniline | do | Orange yellow. |
| p-Nitraniline | do | Yellow. |
| 3-nitro-4-amino-toluene | do | Orange Yellow. |
| 2-nitro-4-amino-1.3-xylene | do | Yellow. |
| 5-chloro-2-aminotoluene | do | Do. |
| 2-nitro-4-amino-5-methoxytoluene | do | Reddish yellow. |
| 5-nitro-2-amino-toluene | do | Do. |
| Alpha-aminoanthraquinone | do | Orange. |
| 5-nitro-2-amino-anisole | do | Reddish yellow. |
| o-Chloraniline | do | Greenish yellow. |
| m-Chloraniline | do | Do. |
| o-Nitraniline | do | Reddish yellow. |

| Diazo component | Coupling component | Shade on cotton |
|---|---|---|
| m-Nitraniline | 6-acetoacetylamino-5-chloro-2-p-acetoacetylamino-phenyl-benzothiazole. | Yellow. |
| 2-chloro-4-aminotoluene | ....do.... | Do. |
| 2.5-dichloraniline | ....do.... | Greenish yellow. |
| 4-nitro-2-amino-toluene | ....do.... | Yellow. |
| 4-nitro-2-amino-anisole | ....do.... | Do. |
| o-Chloraniline | 6-acetoacetylamino-2-p-acetoacetyl-amino-phenyl-benzo-thiazole. | Vivid Greenish yellow. |
| m-Chloraniline | ....do.... | Do. |
| o-Nitraniline | ....do.... | Vivid orange. |
| m-Nitraniline | ....do.... | Yellow. |
| 2-chloro-4-amino-toluene | ....do.... | Vivid greenish yellow. |
| 2.5-dichloraniline | ....do.... | Golden yellow. |
| 4-nitro-2-amino-toluene | ....do.... | Yellow. |
| 4-nitro-2-aminoanisole | ....do.... | Do. |
| p-Chloro-o-nitraniline | ....do.... | Orange red. |
| p-Nitraniline | ....do.... | Reddish yellow. |
| 3-nitro-4-amino-toluene | ....do.... | Orange. |
| 2-nitro-4-amino-1.3-xylene | ....do.... | Vivid greenish yellow. |
| o-Chloraniline | 5-acetoacetylamino-2-p-acetoacetyl-amino-phenyl-benzothiazole. | Do. |
| m-Chloraniline | ....do.... | Greenish yellow. |
| o-Nitraniline | ....do.... | Orange yellow. |
| m-Nitraniline | ....do.... | Yellow. |
| 2-chloro-4-amino-toluene | ....do.... | Greenish yellow. |
| 2.5-dichloraniline | ....do.... | Yellow. |
| 4-nitro-2-amino-toluene | | Vivid yellow. |
| 4-nitro-2-amino-anisole | ....do.... | Reddish yellow. |
| p-Chloro-o-nitraniline | ....do.... | Orange brown. |
| p-Nitraniline | ....do.... | Reddish yellow. |
| 3-nitro-4-amino-toluene | ....do.... | Orange. |
| 2-nitro-4-amino-1.3-xylene | ....do.... | Vivid greenish yellow. |
| 5-chloro-2-amino-toluene | ....do.... | Do. |
| 2-nitro-4-amino-5-methoxy-toluene | ....do.... | Yellow. |
| 5-nitro-2-amino-toluene | ....do.... | Reddish yellow. |
| Alpha-aminoanthraquinone | ....do.... | Reddish orange. |
| 5-nitro-2-aminoanisol | ....do.... | Yellow. |
| 4-chloro-2-amino-toluene | ....do.... | Golden yellow. |
| 4-chloro-2-aminoanisole | ....do.... | Vivid greenish yellow. |
| 2-methoxy-4-benzoylamino-5-methylaminobenzene | ....do.... | Brownish yellow. |
| 3-nitro-4-amino-anisole | ....do.... | Vivid reddish orange. |
| 4'-methoxy-4-amino-diphenylamine | ....do.... | Bordeaux. |
| Diaminodiphenylamine-azo-3-amino-4-methoxytoluene | ....do.... | Violet Bordeaux. |
| p-Chloro-o-nitraniline | 6-acetoacetylamino-2-phenyl-benzo-thiazole | Orange yellow. |
| o-Chloraniline | 6-acetoacetylamino-5-methyl-2-phenyl-benzoxazole | Vivid yellow. |
| 2.5-dichloraniline | ....do.... | Golden yellow. |
| m-Chloraniline | ....do.... | Greenish yellow. |
| p-Chloro-o-nitraniline | ....do.... | Orange. |
| 4-chloro-2-amino-anisole | ....do.... | Yellowish orange. |
| Alpha-aminoanthraquinone | ....do.... | Do. |
| 4-chloro-2-aminotoluene | ....do.... | Greenish yellow. |
| 5-nitro-2-aminotoluene | ....do.... | Orange. |
| o-Chloraniline | 6-acetoacetylamino-5-methyl-2-phenyl-benzothiazole | Yellow. |
| 2.5-dichloraniline | ....do.... | Reddish yellow. |
| m-Chloraniline | ....do.... | Yellow. |
| p-Chloro-o-nitraniline | ....do.... | Yellowish orange. |
| 4-chloro-2-amino-anisole | ....do.... | Reddish yellow. |
| Alpha-aminoanthraquinone | ....do.... | Orange. |
| 4-chloro-2-aminotoluene | ....do.... | Yellow. |
| 5-nitro-2-amino-toluene | ....do.... | Reddish yellow. |
| 4-chloro-2-amino-anisole | 5-acetoacetylamino-2-p-acetoacetyl-aminophenyl-benzoxazole. | Vivid greenish yellow. |
| Alpha-amino-anthraquinone | ....do.... | Orange. |
| 5-nitro-2-aminoanisole | ....do.... | Golden yellow. |
| 3-nitro-4-aminoanisole | ....do.... | Vivid orange. |
| 4'-methoxy-4-aminodiphenyl-amine | ....do.... | Reddish brown. |
| 2-diethylsulphamido-4-benzoylamino-5-methoxy-amino-benzene. | ....do.... | Vivid yellow. |
| p-Aminodiphenylamine | ....do.... | Brown. |
| Diamino-diphenylamine-azo-3-amino-4-methoxy-toluene | ....do.... | Reddish Bordeaux. |
| p-Chloro-o-nitraniline | ....do.... | Vivid golden yellow. |
| p-Nitraniline | ....do.... | Yellow. |
| 3-nitro-4-aminotoluene | ....do.... | Vivid golden yellow. |
| 2-nitro-4-amino-1.3-xylene | ....do.... | Vivid greenish yellow. |
| 5-chloro-2-amino-toluene | ....do.... | Greenish yellow. |
| 2-nitro-4-amino-5-methoxy-toluene | ....do.... | Yellow. |
| 5-nitro-2-amino-toluene | ....do.... | Vivid yellow. |
| o-Chloraniline | 5-methoxy-6-acetoacetylamino-2-phenylbenzothiazole. | Do. |
| m-Chloraniline | ....do.... | Greenish yellow. |
| o-Nitraniline | ....do.... | Vivid yellow. |
| m-Nitraniline | ....do.... | Greenish yellow. |
| 2-chloro-4-amino-toluene | ....do.... | Do. |
| 2.5-dichloraniline | ....do.... | Vivid reddish yellow. |
| 4-nitro-2-amino-anisole | ....do.... | Vivid golden yellow. |
| 4-nitro-2-amino-toluene | ....do.... | Reddish yellow. |
| p-Chloro-o-nitraniline | ....do.... | Vivid orange. |
| p-Nitraniline | ....do.... | Yellow. |
| 3-nitro-4-amino-toluene | ....do.... | Yellow orange. |
| 2-nitro-4-amino-1. 3-xylene | ....do.... | Vivid greenish yellow. |
| 5-chloro-2-amino-toluene | ....do.... | Do. |
| 2-nitro-4-amino-5-methoxy-toluene | ....do.... | Yellow. |
| 5-nitro-2-amino-toluene | ....do.... | Vivid golden yellow. |
| 4-chloro-2-amino-toluene | ....do.... | Vivid greenish yellow. |
| 4-diethylsulphamido-2-amino-anisole | ....do.... | Yellow. |
| o-Amino-azo-toluene | ....do.... | Orange. |
| 6-chloro-2-amino-toluene | ....do.... | Yellow. |
| 2-methoxy-4-benzoylamino-5-methylaminobenzene | ....do.... | Vivid yellow. |
| 4-amino-anisole | ....do.... | Do. |
| Alpha-aminoanthraquinone | ....do.... | Orange. |
| 5-nitro-2-aminoanisole | ....do.... | Vivid orange. |
| 3-nitro-4-amino-anisole | ....do.... | Orange. |
| 4'-methoxy-4-aminodiphenylamine | ....do.... | Yellow brown. |
| 2-diethylsulphamido-4-benzoylamino-5-methoxy-amino-benzene. | ....do.... | Vivid yellow. |
| 4-amino-diphenylamine | ....do.... | Yellowish brown. |
| Diamino-diphenylamine-azo-3-amino-4-methoxytoluene | ....do.... | Violet Bordeaux. |
| o-Nitraniline | 5-acetoacetylamino-2-phenylbenzoxazole | Vivid greenish yellow. |
| 5-nitro-2-amino-toluene | ....do.... | Vivid yellow. |
| 5-chloro-2-amino-toluene | ....do.... | Yellow. |

| Diazo component | Coupling component | Shade on cotton |
|---|---|---|
| 2.5-dichloraniline | 5-chloro-6-acetoacetylamino-2-phenyl-benzoxazole | Orange yellow. |
| p-Chloro-o-nitraniline | do | Yellow. |
| Alpha-aminoanthraquinone | do | Orange yellow. |
| o-Nitraniline | do | Yellow. |
| o-Nitraniline | 5-acetoacetylamino-2-phenylbenzothiazole | Do. |
| p-Chloro-o-nitraniline | do | Do. |
| 5-chloro-2-aminotoluene | do | Do. |
| Alpha-amino-anthraquinone | do | Orange yellow. |
| o-Chloraniline | 2-p-acetoacetylamino-phenyl-benzoxazole | Vivid greenish yellow. |
| m-Chloraniline | do | Greenish yellow. |
| o-Nitraniline | do | Yellow. |
| m-Nitraniline | do | Do. |
| 2-chloro-4-amino-toluene | do | Greenish yellow. |
| 2.5-dichloraniline | do | Vivid yellow. |
| 4-nitro-2-amino-anisole | do | Do. |
| 4-nitro-2-amino-toluene | do | Vivid golden yellow. |
| p-Chloro-o-nitraniline | do | Orange. |
| p-Nitraniline | do | Vivid yellow. |
| 3-nitro-4-amino-toluene | do | Vivid golden yellow. |
| 2-nitro-4-amino-1.3-xylene | do | Yellow. |
| 5-chloro-2-amino-toluene | do | Greenish yellow. |
| 2-nitro-4-amino-5-methoxy-toluene | do | Vivid greenish yellow. |
| 5-nitro-2-amino-toluene | do | Do. |
| 4-chloro-2-amino-anisole | do | Yellow. |
| Alpha-amino-anthraquinone | do | Reddish yellow. |
| 5-nitro-2-amino-anisole | do | Vivid golden yellow. |
| 3-nitro-4-amino-anisole | do | Vivid reddish yellow. |
| 4'-methoxy-4-aminodiphenyl-amine | do | Brown orange. |
| 4-chloro-2-amino-toluene | do | Vivid greenish yellow. |
| 4-diethylsulphamido-2-amino-anisole | do | Vivid yellow. |
| o-Amino-azo-toluene | do | Orange yellow. |
| 6-chloro-2-amino-toluene | do | Greenish yellow. |
| 2-methoxy-4-benzoylamino-5-methylamino-benzene | do | Vivid golden yellow. |
| 2-diethylsulphamido-4-benzoyl-amino-5-methoxy-amino-benzene. | do | Vivid greenish yellow. |
| 4-amino-diphenylamine | do | Orange brown. |
| Diamino-diphenylamine-azo-3-amino-4-methoxy-toluene. | do | Violet Bordeaux. |
| o-Chloraniline | 5-methoxy-6-aceto-acetylamino-2-phenyl-benzoxazole | Vivid yellow. |
| m-Chloraniline | do | Yellow. |
| o-Nitraniline | do | Golden yellow. |
| m-Nitraniline | do | Greenish yellow. |
| 2-chloro-4-amino-toluene | do | Do. |
| 2.5-dichloraniline | do | Orange yellow. |
| 4-nitro-2-amino-anisole | do | Golden yellow. |
| 4-nitro-2-amino-toluene | do | Reddish yellow. |
| 4-chloro-2-amino-anisole | do | Yellow. |
| Alpha-amino-anthraquinone | do | Reddish yellow. |
| 5-nitro-2-amino-anisole | do | Orange yellow. |
| 3-nitro-4-amino-anisole | do | Reddish yellow. |
| 4'-methoxy-4-aminodiphenyl-amine | do | Brown. |
| p-Chloro-o-nitraniline | do | Reddish yellow. |
| p-Nitraniline | do | Do. |
| 3-nitro-4-amino-toluene | do | Do. |
| 2-nitro-4-amino-1.3-xylene | do | Greenish yellow. |
| 5-chloro-2-amino-toluene | do | Do. |
| 2-nitro-4-amino-5-methoxy-toluene | do | Yellow. |
| 5-nitro-2-amino-toluene | do | Reddish yellow. |
| 4-chloro-2-amino-toluene | do | Vivid greenish yellow. |
| 4-diethylsulphamido-2-amino-anisole | do | Greenish yellow. |
| o-Amino-azo-toluene | do | Yellow orange. |
| 6-chloro-2-amino-toluene | do | Yellow. |
| 2-methoxy-4-benzoylamino-5-methylaminobenzene | do | Vivid yellow. |
| 2-diethylsulphamido-4-benzoyl-amino-5-methoxy-amino-benzene. | do | Vivid golden yellow. |
| o-Chloraniline | 5-chloro-6-aceto-acetylamino-2-phenyl-benzothiazole | Vivid greenish yellow. |
| m-Chloraniline | do | Greenish yellow. |
| o-Nitraniline | do | Yellow. |
| m-Nitraniline | do | Vivid yellow. |
| 2-chloro-4-amino-toluene | do | Yellow. |
| 2.5-dichloraniline | do | Vivid greenish yellow. |
| 4-nitro-2-amino-anisole | do | Vivid yellow. |
| 4-nitro-2-amino-toluene | do | Vivid golden yellow. |
| p-Chloro-o-nitraniline | do | Do. |
| p-Nitraniline | do | Golden yellow. |
| 3-nitro-4-amino-toluene | do | Vivid golden yellow. |
| 2-nitro-4-amino-1.3-xylene | do | Vivid greenish yellow. |
| 5-nitro-2-amino-toluene | do | Golden yellow. |
| 5-chloro-2-amino-toluene | do | Greenish yellow. |
| 2-nitro-4-amino-5-methoxy-toluene | do | Vivid yellow. |
| 4-chloro-2-amino-toluene | do | Vivid greenish yellow. |
| 4-diethylsulphamido-2-amino-anisole | do | Yellow. |
| o-Amino-azo-toluene | do | Vivid orange. |
| 6-chloro-2-amino-toluene | do | Yellow. |
| 2-methoxy-4-benzoylamino-5-methyl-aminobenzene | do | Vivid golden yellow. |
| 4-chloro-2-aminoanisole | do | Vivid greenish yellow. |
| Alpha-amino-anthraquinone | do | Orange yellow. |
| 5-nitro-2-amino-anisole | do | Golden yellow. |
| 3-nitro-4-amino-anisole | do | Reddish yellow. |
| 4'-methoxy-4-aminodiphenylamine | do | Reddish brown. |
| 2-diethylsulphamido-4-benzoylamino-5-methoxy-amino-benzene. | do | Vivid greenish yellow. |
| p-Amino-diphenylamine | do | Yellowish brown. |
| Diamino-diphenylamine-azo-3-amino-4-methoxytoluene | do | Violet Bordeaux. |
| o-Chloraniline | 5-acetoacetylamino-2-p-acetoacetylamino-phenyl-benzoxazole. | Vivid greenish yellow. |
| m-Chloraniline | do | Vivid yellow. |
| o-Nitraniline | do | Do. |
| m-Nitraniline | do | Yellow. |
| 2-chloro-4-amino-toluene | do | Greenish yellow. |
| 2.5-dichloraniline | do | Vivid yellow. |
| 4-nitro-2-aminoanisole | do | Do. |
| 4-nitro-2-aminotoluene | do | Vivid orange yellow. |
| 4-chloro-2-amino-toluene | do | Vivid greenish yellow. |
| 4-diethylsulphamido-2-amino-anisole | do | Reddish yellow. |
| o-Amino-azo-toluene | do | Vivid orange. |
| 6-chloro-2-amino-toluene | do | Reddish yellow. |
| 2-methoxy-4-benzoylamino-5-methylamino-benzene | do | Vivid golden yellow. |
| 4-chloro-2-aminoanisole | do | Vivid greenish yellow. |

| Diazo component | Coupling component | Shade on cotton |
|---|---|---|
| o-Chloraniline | 6-acetoacetylamino-2-phenylbenzothiazole | Vivid greenish yellow. |
| o-Nitraniline | do | Orange yellow. |
| 2.5-dichloraniline | do | Yellow. |
| m-Nitraniline | do | Orange yellow. |
| Alpha-aminoanthraquinone | do | Orange. |
| 4-chloro-2-aminotoluene | do | Yellow. |
| m-Nitro-p-toluidine | do | Orange yellow. |
| m-Nitro-o-toluidine | do | Brown yellow. |
| p-Nitro-o-anisidine | do | Orange. |
| m-Nitro-p-anisidine | do | Do. |
| Tolidine | do | Brown. |
| 4-methoxy-4-amino-diphenylamine | do | Reddish brown. |
| o-Amino-azo-toluene | do | Brownish orange. |

What we claim is:

1. The water insoluble azo-dyestuffs having the general formula:

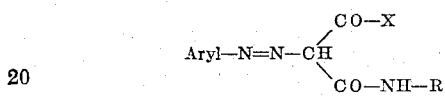

wherein X stands for a member of the group consisting of the alkyl and phenyl radicals and R for a residue of a member of the group consisting of the 6, 5, p- and m-amino-2-phenyl-benzoxazoles and the 6- and 5-amino-2-phenyl-benzo-thiazoles, and their substitution products by members of the group consisting of the alkyl alkoxy and aryloxy groups and the halogen atoms.

2. The water insoluble azo-dyestuffs having the general formula:

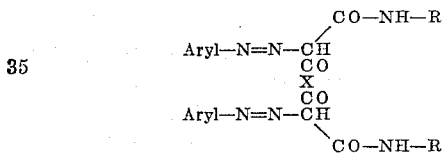

where X stands for a member of the group consisting of the alkyl and phenyl radicals and R for a residue of a member of the group consisting of the 6, 5 p- and m-amino-2-phenyl-benzoxazoles and the 6- and 5-amino-2-phenyl-benzo-thiazoles, and their substitution products by members of the group consisting of the alkyl, alkoxy and aryloxy groups and the halogen atoms.

3. The water insoluble azo-dyestuffs having the general formula:

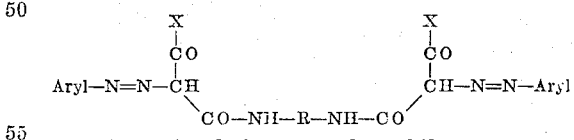

wherein X stands for a member of the group consisting of the alkyl and phenyl radicals and R stands for a residue of a member of the group consisting of the 6-amino-, 5-amino-2 (aminophenyl) benzothiazoles and benzoxazoles and their substitution products by members of the group consisting of the alkyl, alkoxy and aryloxy groups and the halogen atoms.

4. Process for the manufacture of water-insoluble azodyestuffs which consists in coupling the diazo derivatives of amines not containing solubilising groups, with acylacetylated derivatives of heterocyclic bases being a member of the group consisting of the 6, 5, p and m-amino-2-phenylbenzoxazoles, the 6 and 5-amino-2-phenylbenzothiazoles, the 6-amino, 5-amino-2(-aminophenyl)-benzothiazoles and benzoxazoles and their products of substitution by a member of the group consisting of the alkyl, alkoxy, aryloxy groups and the halogen atoms.

5. Process for the manufacture of water-insoluble azodyestuffs which consists in coupling the diazo derivatives of amines not containing solubilising groups, with acylacetylated derivatives of heterocyclic bases forming part of the group consisting of the 6, 5, p and m-amino-2-phenylbenzoxazoles, the 6 and 5-amino-2-phenylbenzothiazoles, the 6-amino, 5-amino-2(-aminophenyl)-benzothiazoles and benzoxazoles, and containing alkyl groups incapable of rendering the products soluble in water.

6. Process for the manufacture of water-insoluble azodyestuffs which consists in coupling the diazo derivatives of amines not containing solubilising groups, with acylacetylated derivatives of heterocyclic bases forming part of the group consisting of the 6, 5, p and m-amino-2-phenylbenzoxazoles, the 6 and 5-amino-2-phenylbenzothiazoles, the 6-amino, 5-amino-2(-aminophenyl)-benzothiazoles and benzoxazoles, and containing alkoxy groups incapable of rendering the products soluble in water.

7. Process for the manufacture of water-insoluble azodyestuffs which consists in coupling the diazo derivatives of amines not containing solubilising groups, with acylacetylated derivatives of heterocyclic bases forming part of the group consisting of the 6, 5, p and m-amino-2-phenylbenzoxazoles, the 6 and 5-amino-2-phenylbenzothiazoles, the 6-amino, 5-amino-2(-aminophenyl)-benzothiazoles and benzoxazoles, and containing halogen atoms incapable of rendering the products soluble in water.

PIERRE PETITCOLAS.
RENÉ GOUPIL.
JOSEPH FRENKIEL.
RUDOLF SENTI.